(12) United States Patent
Reial et al.

(10) Patent No.: US 10,396,880 B2
(45) Date of Patent: Aug. 27, 2019

(54) BEAM-FORMING SELECTION

(71) Applicant: Telefonaktiebolaget LM Ericsson (publ), Stockholm (SE)

(72) Inventors: Andres Reial, Malmo (SE); Anders Wallen, Ystad (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 231 days.

(21) Appl. No.: 15/115,261

(22) PCT Filed: Feb. 6, 2014

(86) PCT No.: PCT/EP2014/052300
§ 371 (c)(1),
(2) Date: Jul. 28, 2016

(87) PCT Pub. No.: WO2015/117651
PCT Pub. Date: Aug. 13, 2015

(65) Prior Publication Data
US 2017/0005716 A1    Jan. 5, 2017

(51) Int. Cl.
*H04W 4/00* (2018.01)
*H04B 7/06* (2006.01)
(Continued)

(52) U.S. Cl.
CPC ......... *H04B 7/0695* (2013.01); *H04B 7/0408* (2013.01); *H04B 7/063* (2013.01); *H04W 24/10* (2013.01); *H04W 72/085* (2013.01)

(58) Field of Classification Search
CPC .................................................. H04B 7/0408
See application file for complete search history.

(56) References Cited

U.S. PATENT DOCUMENTS 5,258,981 A * 11/1993 Davey ................ H04M 1/72511
370/311
6,597,927 B1 * 7/2003 Eswara .................. H01Q 1/246
370/334
(Continued)

FOREIGN PATENT DOCUMENTS

CN    102111199 A    6/2011
EP    1267443 A2    12/2002
(Continued)

OTHER PUBLICATIONS

PCT International Search Report, dated Dec. 8, 2014, in connection with International Application No. PCT/EP2014/052300, all pages.
(Continued)

*Primary Examiner* — Guang W Li
(74) *Attorney, Agent, or Firm* — Leffler Intellectual Property Law, PLLC

(57) ABSTRACT

A method of a wireless communication access node is disclosed. The wireless communication access node is adapted to establish a wireless communication link to a wireless communication device by beam-formed transmission using a beam-forming alternative selected from a plurality of beam-forming alternatives each corresponding to a direction emanating from the wireless communication access node. The method comprises simultaneously transmitting two or more beacon signals having different respective predetermined content, wherein each beacon signal is transmitted using a respective one of the plurality of beam-forming alternatives and wherein the predetermined content of each beacon signal is associated with the direction corresponding to the respective beam-forming alternative. The method also comprises receiving a beacon reading report from the wireless communication device, wherein the beacon reading report is indicative of a reception quality at the wireless communication device of the two or more (Continued)

beacon signals, and selecting the beam-forming alternative for establishment of the wireless communication link based on the received beacon reading report. Corresponding arrangement, wireless communication access node and computer program product are also disclosed, as well as a method of a wireless communication device and corresponding arrangement, wireless communication device and computer program product.

27 Claims, 2 Drawing Sheets

(51) Int. Cl.
*H04B 7/0408* (2017.01)
*H04W 24/10* (2009.01)
*H04W 72/08* (2009.01)

(56) References Cited

U.S. PATENT DOCUMENTS

| | | | |
|---|---|---|---|
| 8,583,055 B2* | 11/2013 | Park | H04B 7/0617 342/373 |
| 9,191,875 B1* | 11/2015 | Kazeminejad | H04W 52/245 |
| 9,325,540 B2* | 4/2016 | Zhang | H04L 25/03904 |
| 9,634,750 B2* | 4/2017 | Kwak | H04B 7/0617 |
| 9,867,091 B2* | 1/2018 | Jo | H04W 36/0083 |
| 9,887,745 B2* | 2/2018 | Chiu | H04B 7/0408 |
| 2002/0051430 A1* | 5/2002 | Kasami | H04W 16/28 370/319 |
| 2006/0251036 A1* | 11/2006 | Gollamudi | H04B 7/0491 370/342 |
| 2009/0170468 A1* | 7/2009 | Kane | G01G 21/20 455/404.2 |
| 2009/0227260 A1* | 9/2009 | Anreddy | H04B 7/0452 455/450 |
| 2011/0158189 A1 | 6/2011 | Kuo et al. | |
| 2013/0072244 A1 | 3/2013 | Jeong et al. | |
| 2013/0343303 A1* | 12/2013 | Kim | H04B 7/0452 370/329 |
| 2014/0362253 A1* | 12/2014 | Kim | H04N 5/262 348/231.4 |
| 2015/0004918 A1* | 1/2015 | Wang | H04W 88/02 455/73 |
| 2015/0092676 A1* | 4/2015 | Periyalwar | H04W 4/029 370/329 |
| 2015/0131616 A1* | 5/2015 | Jo | H04W 16/28 370/331 |
| 2016/0099761 A1* | 4/2016 | Chen | H04B 7/0408 370/336 |

FOREIGN PATENT DOCUMENTS

| | | |
|---|---|---|
| EP | 1267443 A3 | 9/2003 |
| WO | 2006113188 A2 | 10/2006 |
| WO | 2006113188 A3 | 10/2006 |
| WO | 2007133051 A2 | 11/2007 |
| WO | 2013086164 A1 | 6/2013 |
| WO | 2013086410 A2 | 6/2013 |
| WO | 2013154584 A1 | 10/2013 |

OTHER PUBLICATIONS

PCT Written Opinion, dated Dec. 8, 2014, in connection with International Application No. PCT/EP2014/052300, all pages.
European Communication dated Apr. 17, 2018 in connection with European Application No. 14705485.2, 6 pages.

* cited by examiner

BEAM-FORMING SELECTION

TECHNICAL FIELD

The present invention relates generally to the field of wireless communication using beam-forming. More particularly, it relates to selection of one of a plurality of beam-forming alternatives for use in wireless communication.

BACKGROUND

Beam-forming is a well-known technique in the field of wireless (e.g. radio) communication. It may, for example, be used for improving the signal-to-noise ratio (SNR) for a communication link by steering the transmitted energy in, or collecting the received energy from, a favorable direction. As referred to herein, beam-forming may conceptually be accomplished by any suitable known or future techniques, and applicable details of those techniques will not be elaborated on further.

One example area of application where beam-forming may be particularly beneficial is millimeter wave (mmW) communication, where antenna apertures are typically small. Successful millimeter wave communication may even rely on effective beam-forming to accomplish acceptable performance (e.g. sufficient link budget) in some scenarios. This may, for example, be due to that the free-space attenuation of the radio signals that is associated with the high carrier frequencies used for millimeter wave communication is higher than the free-space attenuation of radio signals for lower carrier frequencies. To this end, highly directive beam-forming (i.e. using narrowly directed beams—high beam-forming resolution—achieved e.g. by an antenna array having a large number of antenna elements) may be applied in typical millimeter wavelength communication situations. Thus, in a typical millimeter wave communication application, many different beam-forming configurations may be possible but only one (or a few) enable efficient communications.

With a large number of antenna elements and high beam-forming resolution, it is typically very challenging to determine the optimal (or even a sufficiently good) beam direction. Different techniques to solve this problem are available.

For example, WO 2013/086164 A1 discloses an example method for millimeter wave beam acquisition.

One example a technique for determining beam direction is beam-sweeping, where a signal (e.g. a beacon signal, such as a pilot signal or a sync signal) is transmitted sequentially in different directions (corresponding to applicable beam-forming possibilities) and a communication link may be established based on how the signal of the different transmission instances is received at a prospective receiving device.

One problem with beam-sweeping is that—especially with a large number of possible beam directions—it may take a long time to find an optimal (or even a good enough) beam direction. This may, in turn, lead to that the fraction of time allocated for the initial search of an applicable beam direction may be undesirably large.

Therefore, there is a need for methods and arrangements for efficient selection of a beam-forming alternative among a plurality of beam-forming alternatives.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It should be noted that problems and solutions presented herein are not generally limited to millimeter wave applications. Contrarily, embodiments may be equally applicable in other communication situations where beam-forming is used.

It is an object of some embodiments to obviate at least some of the above disadvantages and to provide methods and arrangements for efficient selection of a beam-forming alternative among a plurality of beam-forming alternatives.

According to a first aspect, this is achieved by a method of a wireless communication access node adapted to establish a wireless communication link to a wireless communication device by beam-formed transmission using a beam-forming alternative selected from a plurality of beam-forming alternatives, each corresponding to a direction emanating from the wireless communication access node.

The method comprises simultaneously transmitting two or more beacon signals having different respective predetermined content, wherein each beacon signal is transmitted using a respective one of the plurality of beam-forming alternatives and wherein the predetermined content of each beacon signal is associated with the direction corresponding to the respective beam-forming alternative.

The method also comprises receiving a beacon reading report from the wireless communication device, wherein the beacon reading report is indicative of a reception quality at the wireless communication device of the two or more beacon signals, and selecting the beam-forming alternative for establishment of the wireless communication link based on the received beacon reading report.

According to some embodiments, the method may be particularly suitable for use in millimeter wave communication. Millimeter wave communication may, for example, be defined as wireless communication using carrier frequencies above a millimeter wave communication threshold. The millimeter wave communication threshold may, typically, have a value in the range 1-1000 GHz, in the range 10-100 GHz or in the range 30-300 GHz. For example, the millimeter wave communication threshold may have a value equal to 10, 28, 30, 60, 100, 300, or 1000 GHz. Use of other (e.g. higher or lower) frequencies as suitable to define the millimeter wave communication threshold is not excluded.

The access node may, for example, be a network node (such as a base station or a relay node) for a cellular communication system or an access node for wireless local area network (WLAN) communication (e.g. in accordance with any suitable IEEE 802.11 standard).

The access node may, in some embodiments, comprise an antenna array and a corresponding beam-forming unit together adapted to provide the plurality of beam-forming alternatives.

A beacon signal may, according to some embodiments, be defined as a signal with predetermined content suitable to be used for detection and/or identification processes. In this context, the detection and/or identification may, typically, refer to detection and/or identification of a suitable beam-forming alternative.

In some embodiments, the simultaneous transmission of two or more beacon signals comprises simultaneous transmission of two or more beacon signals in the same frequency band. For example, the two or more beacon signals may be partly or fully overlapping in the frequency domain.

Simultaneously transmitting two or more beacon signals using a respective one of the plurality of beam-forming alternatives may, according to some embodiments, comprise one of:

simultaneously transmitting beacon signals using all of the beam-forming alternatives in the plurality of beam-forming alternatives, and simultaneously transmitting beacon signals using a subset of the beam-forming alternatives in the plurality of beam-forming alternatives, wherein the subset comprises more than one beam-forming alternative. For example, each subset may comprise M/N beam-forming alternatives, where M is the number beam-forming alternatives in the plurality of beam-forming alternatives and N is smaller than M. N may be an integer according to some embodiments. In some embodiments, M equals an integer multiplied with N.

In embodiments where simultaneous transmission of beacon signals using a subset of the beam-forming alternatives is applied, the method may further comprise changing the subset over time. For example, the method may comprise changing the subset over time so that all of the beam-forming alternatives in the plurality of beam-forming alternatives are used for transmission of beacon signals over a period of time. The various subsets may be disjoint according to some embodiments.

In some embodiments, the method of the first aspect may be performed as part of a communication link establishment (set up) process.

According to some embodiments, the method may further comprise establishing the wireless communication link to the wireless communication device and using the selected beam-forming alternative for wireless communication with the wireless communication device over the wireless communication link.

The beacon reading report may, for example, be received over an up-link channel (e.g. a random access channel, or another suitable up-link channel) of a cellular communication system or over a random access channel of any other suitable wireless communication system (e.g. a WLAN system). The beacon reading report may be received over a channel that is part of the same communication system as the wireless communication link that is to be established to the wireless communication device, or a channel that is part of a different communication system.

According to some embodiments, the beacon reading report may comprise (as an indication of reception quality) one or more of:

for one or more of the two or more beacon signals, an indication of whether or not the beacon signal is detected by the wireless communication device, for one or more of the two or more beacon signals, a received signal strength of the beacon signal at the wireless communication device, a beam direction setting of the wireless communication device, an optimal direction indicator indicative of a direction associated with a strongest received beacon signal, and an optimal direction indicator indicative of an interpolation between two or more directions associated with respective received beacon signals.

When referring herein to received signal strength, it should be understood that similar metrics (e.g. signal-to-noise ratio—SNR, signal-to-interference ratio—SIR, signal-to-interference-and-noise ratio—SINR, reference signal received power—RSRP, reference signal received quality—RSRQ, received signal strength indicator—RSSI, etc.) may, alternatively or additionally, be applied in the same or similar manner according to some embodiments.

It is to be understood that, even if the beacon reading report does not comprise direct indications in relation to all of the two or more transmitted beacon signals, it is still indicative of a reception quality at the wireless communication device of all of the two or more beacon signals, according to some embodiments. For example, absence of direct indication may be interpreted as an indirect indication of a poor reception quality.

The selection of the beam-forming alternative for establishment of the wireless communication link based on the received beacon reading report may, for example, comprise one or more of:

randomly selecting a beam-forming alternative among the beam-forming alternatives corresponding to the beacon signals indicated as detected by the wireless communication device, selecting the beam-forming alternative indicated as corresponding to a highest received signal strength at the wireless communication device, randomly selecting a beam-forming alternative among the beam-forming alternatives indicated as corresponding to a received signal strength at the wireless communication device that exceeds a signal strength threshold, and selecting the beam-forming alternative corresponding to the optimal direction indicator.

In some embodiments, the respective predetermined content of each beacon signal may comprise a reference signal, which is common to all of the two or more beacon signals, and a direction indicator.

The direction indicator may, for example, comprise an azimuth indicator and an elevation indicator.

In some embodiments, the azimuth indicator may be a real (in-phase) component of a transmitted symbol and the elevation indicator may be an imaginary (quadrature) component of the transmitted symbol, or vice versa.

In some embodiments, where the reference indicator comprises a sequence of bits or symbols, the azimuth indicator may comprise a first predetermined number of bits or symbols of the reference indicator and the elevation indicator may comprise a second predetermined number of bits or symbols of the reference indicator.

According to some embodiments, the respective predetermined content of each beacon signal may comprise a reference direction indicator defining a reference beam-forming alternative. For example, the reference direction indicator may also serve as a pilot signal of the system. In some embodiments, the reference direction indicator may comprise a single (pre-determined) bit or symbol, or a sequence of (pre-determined) bits or symbol.

In some embodiments, the respective predetermined content of each beacon signal may provide for a signal distance between beacon signals associated with neighboring directions being above a signal distance threshold.

In these embodiments, it may be desirable to approach orthogonality between beacon signals associated with neighboring directions.

According to some of these embodiments, the signal distance between beacon signals associated with neighboring directions may be provided to be larger than a signal distance between beacon signals associated with non-neighboring directions.

In some embodiments, the respective predetermined content of each beacon signal may provide for a signal distance between beacon signals associated with neighboring directions being smaller than a signal distance between beacon signals associated with non-neighboring directions.

This may, for example, be achieved by using a Gray coding approach (or any similar proximity oriented approach) for the beacon signals. If a reference direction indicator is provided, differential Gray coding (or similar) in relation to the reference direction indicator may be applied.

According to some embodiments having a proximity oriented approach, the beacon signals may be constructed as:
- a sequence of bits transmitted serially over the air interface (i.e. time domain signal distance),
- a set of bits encoded over frequency bins in an orthogonal frequency division multiplex (OFDM) fashion (i.e. frequency domain signal distance),
- one or more higher order symbols (e.g. according to quadrature amplitude modulation—QAM) via multi-level coding (i.e. symbol domain signal distance),
- indications in other domains,
- one or more direction-related phase indication, or
- a combination of two or more of the above examples.

The signal distance may be defined in terms of any suitable known or future metric. For example, the signal distance may be given in terms of a Hamming distance or a Euclidean distance.

A second aspect is a computer program product comprising a computer readable medium, having thereon a computer program comprising program instructions, the computer program being loadable into a data-processing unit and adapted to cause the data-processing unit to execute method steps according to the first aspect when the computer program is run by the data-processing unit.

A third aspect is a method of a wireless communication device adapted to communicate with a wireless communication access node over a wireless communication link established based on beam-formed transmission using a beam-forming alternative selected from a plurality of beam-forming alternatives each corresponding to a direction emanating from the wireless communication access node.

The method comprises receiving at least one of two or more beacon signals having different respective predetermined content, wherein the two or more beacon signals are simultaneously transmitted by the wireless communication access node, each beacon signal is transmitted using a respective one of the plurality of beam-forming alternatives, and the predetermined content of each beacon signal is associated with the direction corresponding to the respective beam-forming alternative.

The method also comprises transmitting a beacon reading report to the wireless communication access node, wherein the beacon reading report is indicative of a reception quality at the wireless communication device of the two or more beacon signals.

In some embodiments, the method may further comprise generating the beacon reading report based on the received at least one of two or more beacon signals. Generating the beacon report may, for example, comprise one or more of:
- detecting the received at least one of two or more beacon signals,
- performing measurements on the received at least one of two or more beacon signals (e.g. measuring one or more metrics related to the received at least one of two or more beacon signals), and
- computing one or more further metrics related to the received at least one of two or more beacon signals.

In some embodiments, the third aspect may additionally have features identical with or corresponding to any of the various features as explained above for the first aspect.

A fourth aspect is a computer program product comprising a computer readable medium, having thereon a computer program comprising program instructions, the computer program being loadable into a data-processing unit and adapted to cause the data-processing unit to execute method steps according to the third aspect when the computer program is run by the data-processing unit.

A fifth aspect is an arrangement for a wireless communication access node adapted to establish a wireless communication link to a wireless communication device by beam-formed transmission using a beam-forming alternative selected from a plurality of beam-forming alternatives each corresponding to a direction emanating from the wireless communication access node. The wireless communication access node comprises an antenna array and a beam-forming unit for implementing the beam-formed transmission and the arrangement comprises a transmitter, a receiver and a controller.

The controller is adapted to cause the transmitter to simultaneously transmit two or more beacon signals having different respective predetermined content, wherein each beacon signal is transmitted using a respective one of the plurality of beam-forming alternatives and wherein the predetermined content of each beacon signal is associated with the direction corresponding to the respective beam-forming alternative.

The controller is also adapted to cause the receiver to receive a beacon reading report from the wireless communication device, wherein the beacon reading report is indicative of a reception quality at the wireless communication device of the two or more beacon signals.

The controller is further adapted to select the beam-forming alternative for establishment of the wireless communication link based on the received beacon reading report.

The beam-forming unit may for example be a phase control unit or a pre-coding unit.

In some embodiments, the controller may be further adapted to cause the wireless communication access node to establish the wireless communication link to the wireless communication device. The controller may also be further adapted to use the selected beam-forming alternative for wireless communication with the wireless communication device over the wireless communication link.

According to some embodiments, the arrangement may further comprise the beam-forming unit.

In some embodiments, the fifth aspect may additionally have features identical with or corresponding to any of the various features as explained above for the first aspect.

A sixth aspect is a wireless communication access node comprising the arrangement according to the fifth aspect.

A seventh aspect is an arrangement for a wireless communication device adapted to communicate with a wireless communication access node over a wireless communication link established based on beam-formed transmission using a beam-forming alternative selected from a plurality of beam-forming alternatives each corresponding to a direction emanating from the wireless communication access node. The arrangement comprises a transmitter, a receiver and a controller.

The controller is adapted to cause the receiver to receive at least one of two or more beacon signals having different respective predetermined content, wherein the two or more beacon signals are simultaneously transmitted by the wireless communication access node, each beacon signal is transmitted using a respective one of the plurality of beam-forming alternatives, and the predetermined content of each beacon signal is associated with the direction corresponding to the respective beam-forming alternative. The controller is also adapted to cause the transmitter to transmit a beacon reading report to the wireless communication access node, wherein the beacon reading report is indicative of a reception quality at the wireless communication device of the two or more beacon signals.

According to some embodiments, the controller may be further adapted to generate the beacon reading report based on the received at least one of two or more beacon signals.

In some embodiments, the seventh aspect may additionally have features identical with or corresponding to any of the various features as explained above for the third aspect.

An eighth aspect is a wireless communication device comprising the arrangement according to the seventh aspect.

An advantage of some embodiments is that efficient selection of a beam-forming alternative among a plurality of beam-forming alternatives is provided.

According to some embodiments, an average time until a suitable beam-forming selection can be made is lowered compared to prior art approaches.

Another advantage of some embodiments is that a faster link establishment may be provided for.

Yet another advantage of some embodiments is that the fraction of time needed for initial search of an applicable beam direction may be reduced.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1:
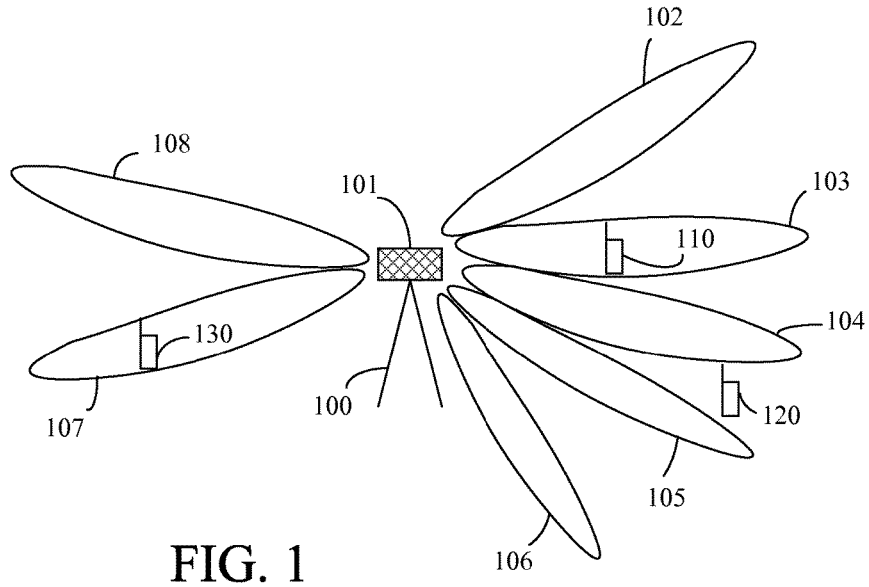
FIG. 1 is a schematic drawing illustrating an example beam-forming scenario according to some embodiments.

FIG. 1 schematically illustrates an example beam-forming scenario according to some embodiments and may be referred to in the following for illustrative purposes. In FIG. 1, an access node 100 comprises an antenna array 101 adapted to transmit signals in a plurality directions (beam-forming alternatives), which is illustrated by the beam-forming lobes 102, 103, 104, 105, 106, 107, 108. A number of devices 110, 120, 130 are present in the vicinity of the access node 100.

If a link is to be established with the device 110, it may be most beneficial to use the beam-forming alternative corresponding to the illustrated lobe 103 and if a link is to be established with the device 130, it may be most beneficial to use the beam-forming alternative corresponding to the illustrated lobe 107. If a link is to be established with the device 120, it may be equally beneficial to use any of the beam-forming alternatives corresponding to the illustrated lobes 104 and 105.

In the following, embodiments will be described where efficient selection of one of a plurality of beam-forming alternatives is provided.

The selected beam-forming alternative is typically intended for use in establishment of a wireless communication link between a wireless communication access node and a wireless communication device (hereinafter also referred to as a link, an access node and a device, respectively).

Each beam-forming alternative corresponds to a direction emanating from the access node. Typically, it may be desirable to select—for establishment of, and communication over, the link—the beam-forming alternative that corresponds to a smallest distance (in a geographical sense or using some other appropriate measure, e.g. a signal space) between the access node and the device. In some situations (e.g. line-of-sight—LOS—scenarios), it may be desirable to select the beam-forming alternative that corresponds to a direction that is closest to the direction towards the device. In some situations (e.g. non-line-of-sight scenarios), a preferred beam-forming alternative may correspond to a direction resulting from a reflection towards the device.

For efficient beam-forming alternative selection, the access node simultaneously transmits two or more beacon signals using a respective one of the plurality of beam-forming alternatives. Each beacon signal has a respective predetermined content, which is different from the content of any other beacon signal. The predetermined content of each beacon signal is associated with the direction corresponding to the respective beam-forming alternative. Each candidate beam-forming alternative (and, correspondingly, each candidate direction) is thus associated with a unique beacon signal.

The possibility to use simultaneous transmission of beacon signals for beam-forming selection is enabled by the use of differing content, and the approach leads to a higher efficiency of the selection process than an approach where a beacon signal is transmitted sequentially using different beam-forming alternatives.

Thus, embodiments described herein may be used in situations where there are many possible beam-forming alternatives at an access node, to efficiently select a beam-forming alternative suitable for communication with a device at a certain location (position). In some examples, the optimal beam-forming alternative is sought in the selection process. In some examples, a good-enough beam-forming alternative is sought in the selection process. Different metrics may be used for the selection, for example, signal strength and/or signal quality.

Embodiments may be particularly suitable for use in millimeter wave communication (or other wireless communication approaches using high frequencies).

Millimeter wave communication may, for example, be defined as wireless communication using carrier frequencies above a millimeter wave communication threshold. Due to the high frequencies used in millimeter wave communication, the signaling range is typically decreased compared with frequencies traditionally used in wireless communication. Thus, beam-forming (with narrowly directed beams and many beam-forming alternatives) may typically be required to achieve an acceptable signaling range for millimeter wave communication systems, which leads to the problem of efficient selection among the beam-forming alternatives.

Millimeter wave communication may, for example, be applied in ultra dense networks (UDN), and/or in conventional small-cell (pico, femto) deployments.

It should be noted that application to millimeter wave communication is merely an illustrative, non-limiting example. Embodiments may be equally applicable in any situation where a beam-forming alternative is to be selected among a plurality of beam-forming alternatives.

In many scenarios, beam-forming may be required in order to achieve high enough SNR for successful communication in frequency ranges used for millimeter wave communication. When several (e.g. two or more) beacon signals are transmitted simultaneously using different beam-forming alternatives (corresponding to different beam directions) the available transmit power of the transmitting access node may typically be shared between the different beacon signals, thus lowering the SNR experienced by a particular receiver of a beacon compared to if all of the available transmit power was used for transmission of a single beacon signal. Even though this may typically be undesirable for efficient high data-rate communication, the lowered SNR may typically be sufficient for the purpose of detecting a beacon signal and thereby determine a suitable beam-forming alternative (corresponding to a suitable direction).

Beam-forming alternatives are typically enabled via use of antenna arrays comprising a plurality of antenna elements. At high frequencies the antenna elements are typically small (approximately proportional to the wave length). Hence, an antenna array for high frequency communication is often of a reasonable size.

In a typical approach, the signal of each antenna element (or of a group of antenna elements) may be individually controlled, whereby the combined signal emitted by the antenna array defines a, thus created, beam-forming alternative.

The control of the antenna elements may be according to any suitable known or future method (e.g. an analog phase control or a digital signal processing control, such as precoding) and will not be elaborated on further.

Furthermore, the antenna array may be embodied in any suitable known or future form. For example, it may comprise a plurality of antenna elements arranged in a matrix or in any other suitable form.

A device (intended for communication with the access node over the link to be established using the beam-forming alternative to be selected) typically monitors transmission of beacons from the access node. If one or more beacon signals are detected, a corresponding beacon reading report is transmitted to the access node, and the access node selects a suitable beam-forming alternative based on the beacon reading report.

The beacon reading report may comprise a single physical message or several physical messages.

The beacon reading report may be transmitted to the access node using any suitable channel.

The beacon reading report may be transmitted over an existing radio link between the device and the access node or, if no such link exists, it may be transmitted in a random access resource (e.g. using the mmW technology).

If random access resources are used for transmission of the beacon reading report, the choice of random access resource may indicate which beacon signal (or which direction) the beacon reading report relates to.

One example comprises using an up-link channel (e.g. a random access channel, or another suitable up-link channel) of a cellular communication system (e.g. UMTS LTE—Universal Mobile Telecommunication Standard, Long Term Evolution) or any other suitable wireless communication system (e.g. a WLAN system).

The channel used to transmit the beacon reading report may be a channel of the same radio access technology system as the system according to which the link is to be established, or it may be a channel of a different radio access technology system.

In some embodiments, the report is transmitted to another access node and received by the access node that transmitted the beacon signals via the other access node.

In some embodiments, a beacon reading report may be transmitted by the device even if no beacon signal was detected. For example, a beacon reading report may be transmitted at predetermined instants in time.

The beacon reading report is indicative of a beacon signal reception quality at the device. The beacon signal quality indication may be embodied in various ways, for example:
an indication of all detected beacon signals,
an indication of the detected beacon signal having best (highest or lowest—depending on the metric) reception quality metric among the detected beacon signals, and
an indication of the detected beacon signals having reception quality metric that fulfills a reporting criterion (e.g. having a value larger, or smaller—depending on the metric, than a reception quality metric threshold).

The reception quality metric may comprise any suitable metric, for example, one or more of a received signal strength, a signal-to-noise ratio—SNR, a signal-to-interference ratio—SIR, a signal-to-interference-and-noise ratio—SINR, a reference signal received power—RSRP, a reference signal received quality—RSRQ, a received signal strength indicator—RSSI, etc.

The access node uses the information indicated in the beacon reading report to select a beam-forming alternative and uses the selected alternative to establish the link and communicate with the device.

If the beacon reading report indicates a single detected beacon signal, the corresponding beam-forming alternative may typically be selected by the access node. If the beacon reading report indicates several detected beacon signals, the access node may use further information (e.g. reception quality metric values also comprised in the beacon reading report) to choose among them.

Figure 2:
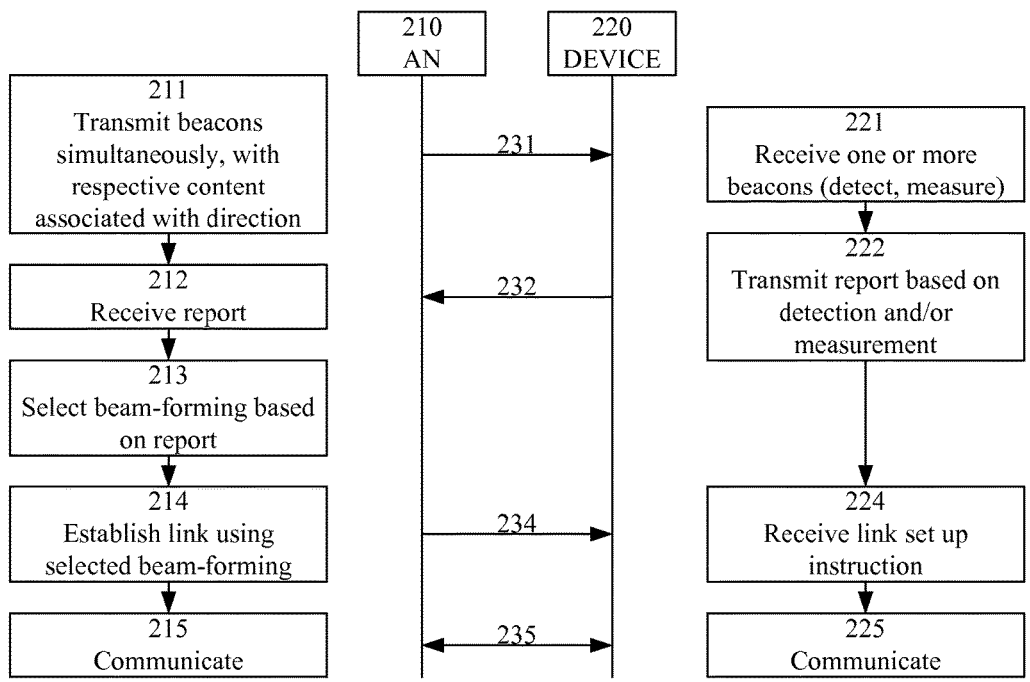
FIG. 2 is a combined flowchart and signaling diagram illustrating example method steps and example signaling according to some embodiments.

FIG. 2 is a combined flowchart and signaling diagram illustrating example method steps and example signaling of an access node (AN) 210 and a device (DEVICE) 220 according to some embodiments. In some embodiments, the example of FIG. 2 may be combined in any suitable way with other examples and embodiments of this disclosure. Non-limiting, illustrative references will also be made to FIG. 1.

The example of FIG. 2 may be applicable to a scenario where a link for communication is to be established between the access node 210, 100 and the device 220, 110, 120, 130 by beam-formed transmission using a beam-forming alternative selected from a plurality of beam-forming alternatives (102, 103, 104, 105, 106, 107, 108), each corresponding to a direction emanating from the access node 210, 100.

In step 211, the access node simultaneously transmits—using a respective beam-forming alternative—two or more beacon signals having different respective predetermined content associated with the direction corresponding to the respective beam-forming alternative. The two or more beacon signals are illustrated by signaling 231.

The two or more beacon signals transmitted simultaneously in step 211 may comprise all of the beam-forming alternatives in the plurality of beam-forming alternatives, or a sub-set thereof. For example, the access node may alternate between N different subsets (N>1) in step 211 to cover all of the beam-forming alternatives over time. At least one of the subsets comprises two or more beacon signals.

In a typical example, each subset comprises M/N beam-forming alternatives, where M is the number of beam-forming alternatives in the plurality of beam-forming alternatives, N (1<N<M) is an integer, and M is divisible by N.

Each of the two or more beacon signals may or may not be detected by the device (i.e. the device may or may not be able to receive all of the simultaneously transmitted beacon signals strongly enough to distinguish them from noise and interference). In a typical embodiment, the device performs a scanning procedure (e.g. testing different hypotheses regarding which beacon signal(s) are present in a received signal) to conclude if one or more beacon signals are detected. In some embodiments, the device performs beacon signal detection and then reports the result to the access node without further scanning.

Step 221 illustrates the device receiving at least one of the transmitted beacon signals. Step 221 may comprise any suitable sub-steps performed by the device in connection with reception of one or more beacon signals, for example, detection, measurements, computations, etc.

The device generates a beacon reading report based on the findings (detection, measurements, computations, etc.) of step 221. The beacon reading report is indicative of a reception quality at the device of the two or more beacon signals.

The beacon reading report typically comprises information in relation to at least one of the detected beacon signals. For example, it may comprise information in relation to the optimal detected beacon signal (e.g. extremum—maximum or minimum, depending on the metric—of reception quality metric), in relation to a group of most promising detected beacon signals (e.g. reception quality metric on a particular—the favorable—side of a reception quality metric threshold), or in relation to all detected beacon signals (regardless of reception quality metric).

For each beacon signal of the beacon reading report, the beacon reading report may comprise an indication that the beacon signal is detected. Such an indication may take the form of a beacon identity.

The beacon identity may be identical to the content of the beacon signal transmitted by the access node, or may be a beacon signal identity representation that the detected beacon signal is mapped to. Such a beacon signal identity representation typically requires less energy to transmit in step 222. It may, for example, be a shorter representation in the digital domain.

For each beacon signal of the beacon reading report, the beacon reading report may possibly also comprise a respective reception quality metric. The reception quality metric may, for example, be a received signal strength at the device or any other suitable metric.

For each beacon signal of the beacon reading report, the beacon reading report may possibly also comprise a corresponding direction indicator. The beacon identity may in itself be a direction indicator according to some embodiments.

In one example, step 221 comprises computing an interpolation between two or more directions and the direction indicator may comprise the direction computed via the interpolation. For example, an interpolation may take the form of:

$$D = \sum_{k=1}^{K} a_k D_k; \text{ where } \sum_{k=1}^{K} a_k = 1,$$

where $D_k$ are the directions used in the interpolation and $a_k$ are interpolation scaling factors. Each of the interpolation scaling factors may typically be chosen as a function of the reception quality metric (e.g. received signal strength, SINR, etc.) of the respective interpolation direction. The interpolation scaling factor of a direction may, for example, be the corresponding reception quality metric normalized by the sum of the reception quality metrics of all directions of the interpolation.

Typically, an interpolation may be made between two or more directions corresponding to detected beacon signals fulfilling a reception quality criterion. For example, an interpolation may be made between directions corresponding to beacon signals having a reception quality metric above a reception quality metric threshold.

Interpolation of directions may be particularly beneficial if the beacon signal transmission of step 211 concerns only a subset of the available beam-forming alternatives.

The location of device 120 of FIG. 1 also illustrates a situation where interpolation may be beneficial.

In some embodiments, step 221 comprises the device alternating between two or more different receiver antenna settings (corresponding to different receiving directions). Thus, detection (or fulfilling a reception quality criterion) may imply identifying a matching combination of antenna settings at the access node and at the device. In such embodiments, the beacon reading report may or may not also comprise the receiver antenna setting associated with reception of each beacon signal of the report. In such embodiments, the transmission of the beacon reading report (see step 222) may comprise applying a corresponding transmission antenna setting.

The beacon reading report may additionally comprise other suitable information.

The beacon reading report may comprise a single physical message or several physical messages. For example, if the access node alternates between different subsets in step 211, each subset transmission may trigger corresponding beacon reading reporting.

In step 222, the device transmits the beacon reading report to the access node as illustrated by signaling 232, and the beacon reading report is received by the access node in step 212.

The beacon reading report may be transmitted using any suitable up-link channel between the device and the access node (e.g. a channel of a cellular communication system, of an ad-hoc system, of a WLAN system, etc.). An example of a suitable up-link channel may be a random access channel.

In step 213, the access node selects a beam-forming alternative for establishment of the link based on the beacon reading report received in step 212.

If the beacon reading report comprises information in relation to only one of the transmitted beacon signals, the selection of step 213 typically comprises selecting the beam-forming alternative that corresponds to that transmitted beacon signal.

If the beacon reading report comprises information in relation to an interpolation of directions, the selection of step 213 typically comprises selecting the beam-forming alternative that corresponds most closely to the interpolated direction.

If the beacon reading report comprises information in relation to two or more of the transmitted beacon signals, the selection of step 213 may comprise selecting the beam-forming alternative that has a maximum (or minimum—depending on the metric) corresponding reported reception quality metric (e.g. the beam-forming alternative having the highest received signal strength). Alternatively, if the beacon reading report comprises information in relation to two or more one of the transmitted beacon signals, the selection of step 213 may comprise selecting randomly among the beam-forming alternatives corresponding to the beacon signals of the report. Other selection alternatives are also possible.

The selected beam-forming alternative is used by the access node, in step 214, to establish the link to the device. For example, a link set-up instruction, illustrated by signaling 234, may be sent to the device, and received by it in step 224. The link set-up instruction may, for example, comprise indications of antenna settings (of the access node and/or of the device).

Once the link is established, the selected beam-forming alternative may be used for communication between the access node and the device as illustrated by signaling 235 and by steps 215 and 225. If the device moves (or if the channel condition changes in some other way) during communication over the established link such that another beam-forming alternative becomes more attractive, a beam-forming tracking mechanism may typically attend to adjustment of which beam-forming alternative is used.

Numerous variations of the disclosed methods may be envisioned leading to further embodiments. A few example variations are disclosed in the following.

- Spatial orthogonality between beacon signals may be increased by transmitting beacon signals using only every $N^{th}$ beam-forming alternative at a time. The parameter N may be chosen based on whether or not interpolation is used, based on antenna geometries, based on beam geometries, etc.
- The SNR (or similar metric) for each transmitted beacon signal may be increased by omitting transmission in directions with no (or low) probability of finding devices. The access node may choose to cut out direction sectors where no beacon signals are transmitted, and/or to selectively reduce the density of beacon signal transmissions (and/or the power density) for directions where no devices have been detected in the recent past.
- The predetermined content of a beacon signal may comprise a reference (e.g. pilot) signal, which is common to all of the two or more beacon signals, and a direction indicator. The reference signal may, for example, comprise a single bit that is constant regardless of the direction
- The directions (of e.g. beam-forming alternatives, beacon signal content, indication of beacon reading report, and/or selection) may be in the form of azimuth only or a combination of azimuth and elevation.
- The predetermined content of a beacon signal may comprise a known time sequence (e.g. enumerated) which differs from the other beacon signals. In this case, the beacon signal detection of the device may comprise correlating with all such known sequences and determining which yields the highest correlation peak.
- The predetermined content of the beacon signals may comprise different code words according to a coding scheme known to the device. In this case, the beacon signal detection of the device may comprise identifying the code word associated with the strongest received beacon signal. The beacon reading report may comprise the corresponding code word.
- The predetermined content of each beacon signal may comprise a reference direction indicator defining a reference beam-forming alternative. The reference direction indicator may also serve as a pilot signal of the system.

Two approaches to design of the predetermined content of different beacon signals will now be discussed in further detail; small signal distance between beacon signals associated with neighboring directions and large signal distance between beacon signals associated with neighboring directions.

The signal distance may be defined in terms of any suitable known or future metric. For example, the signal distance may be given in terms of a Hamming distance or a Euclidean distance.

Small Signal Distance Between Beacon Signals Associated with Neighboring Directions In this approach, the respective predetermined content of each beacon signal provide for a signal distance between beacon signals associated with neighboring directions being smaller than a signal distance between beacon signals associated with non-neighboring directions.

A typical example of this approach relates to using beacon signals chosen such that the signal distance between two beacon signals increases with increasing separation between the corresponding directions.

This may, for example, be achieved by using a proximity oriented beacon signal selection approach. If a reference direction indicator is provided, a differential scheme in relation to the reference direction indicator may be applied.

In this approach, a reference signal in the content of each beacon signal is typically beneficial for determining the preferred direction in absolute terms. The reference signal may, for example, be a single bit that is constant regardless of the direction. Alternatively, another pilot/reference signal of the communication system may be used as a reference.

An example technique that may be applied to achieve a proximity oriented beacon signal selection approach is Gray coding. Gray coding is excellent for identifying the quantized value of the preferred direction since, for any pair of neighboring directions, only one bit position of the corresponding beacon signals differs.

If directions are given in azimuth and elevation, one Gray coding block may indicate the azimuth and another may indicate the elevation. For example, the real (in-phase) component of the beacon signal elements may be used for azimuth indication and the imaginary (quadrature) component of the beacon signal elements may be used for elevation indication, or vice versa. In an example where the reference indicator comprises a sequence of bits or symbols, the azimuth indicator may comprise a first predetermined number of bits or symbols of the reference indicator and the elevation indicator may comprise a second predetermined number of bits or symbols of the reference indicator.

The content of a beacon signal may be transmitted in various ways according to the proximity oriented beacon signal selection approach. For example, the content may comprise one or more of:

- a sequence of bits transmitted serially,
- a set of bits encoded over frequency bins in an OFDM fashion,
- one or more multilevel (hierarchical) coding symbols.

An alternative to the traditional Gray coding scheme (where the individual bits are typically switched in a BPSK manner) that may be used in an alternative implementation is a scheme, is a scheme where the phase of a given beacon signal element is varied in a continuum. For example, the beacon signal element providing lowest direction resolution may be varied in a range from 0 to $2\pi$ radians, the beacon signal element providing next lowest direction resolution may be varied in a range from 0 to 4π radians, and so on until the beacon signal element providing highest direction resolution which may be varied in a range from 0 to 2Lπ radians (where L denotes the number of beacon signal elements). If this implementation is used, the device may (at least under some favorable conditions) both estimate the preferred direction and measure SINR (based on how many beacon signal elements are resolved). Alternatively or additionally, the device may be able to estimate how narrow the beam-forming need to be to achieve a certain performance (e.g. maximize performance). Yet alternatively or additionally, the device may be able to estimate how much spatial reuse is acceptable in the vicinity of the device.

This approach, where the signal distance between beacon signals associated with neighboring directions is smaller than that of beacon signals associated with non-neighboring directions, may be particularly well suited for line-of-sight scenarios.

If the transmission using different beam-forming alternatives is not spatially orthogonal (i.e. if there is power leakage between transmissions using different beam-forming alternatives) the signals for two or more beam-forming alternatives may combine constructively over the transmission channel if this approach is used. This is typically feasible provided that any further encoding of the content of the beacon signal does not destroy the small distance property between neighboring directions. As a non-limiting example, such a situation may be achievable by using repetition codes of the beacon signal message.

This leads to the possibility for the device to perform demodulation and decoding of only one (the combined) signal. If so, the beacon reading report may simply comprise the decoded message, which will typically be close to the content of the beacon signal(s) with highest received signal strength. If two (or more) beacon signals have approximately equal received signal strength, the bit(s) differing between their content will be ambiguous while the coinciding bit(s) will be distinct. A bit (or symbol) reliability indication may also be comprised in the beacon reading report according to some embodiments.

Large Signal Distance Between Beacon Signals Associated with Neighboring Directions In this approach, the respective predetermined content of each beacon signal provide for a signal distance between beacon signals associated with neighboring directions being above a signal distance threshold.

A typical example of this approach relates to using coded beacon signals chosen such that the signal distance between two beacon signal increases with decreasing separation between the corresponding directions.

It may be desirable to approach orthogonality between beacon signals associated with neighboring directions according to this approach.

This may, for example, be achieved by using suitable signal processing of the content before transmission (e.g. spreading, scrambling, forward error correction (FEC) coding, etc.)

If this approach is used, the signals for two or more beam-forming alternatives do not necessarily combine constructively over the transmission channel.

The device performs decoding and demodulation for all relevant beacon signals individually.

One benefit of this approach is that, if an implementation is used where the raw content (before the signal processing, e.g. coding) of neighboring beacon signals have small signal distance, soft value combination of detected and decoded beacon signals may be used in the device (i.e. a constructive combination is performed by the device) to determine the content of the beacon signal(s) with highest received signal strength. In some embodiments, such soft value combining may implement an effective interpolation resulting in a preferred direction. For example, the access node may transmit code words as enumerated beam-forming alternatives (e.g. integers 1, 2, . . . , K), and the soft value combination would yield the fractional preferred direction.

Figure 3:
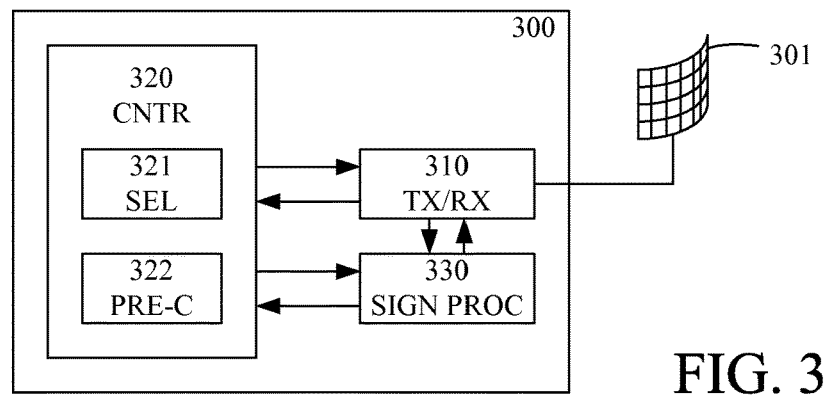
FIG. 3 is a block diagram illustrating an example arrangement according to some embodiments.

FIG. 3 illustrates an example arrangement 300 according to some embodiments. The arrangement 300 may be adapted to perform one or more of the method steps 211, 212, 213, 214 and 215 as described in connection with FIG. 2.

The arrangement 300 may, for example, be comprised in an access node 100, 210 adapted to establish a communication link to a device by beam-formed transmission using a beam-forming alternative selected from a plurality of beam-forming alternatives each corresponding to a direction emanating from the access node.

The arrangement 300 comprises a transmitter and a receiver, together represented as a transceiver (TX/RX) 310, and a controller (CNTR) 320.

The access node also comprises an antenna array 301, 101 and a beam-forming unit for implementing the beam-formed transmission. The beam-forming unit may or may not be comprised in the arrangement 300. In FIG. 3, the beam-forming unit is exemplified as a pre-coding unit (PRE-C) 322 comprised in the controller 320.

The controller 320 is adapted to cause the transmitter 310 to simultaneously transmit—using a respective beam-forming alternative—two or more beacon signals having different respective predetermined content associated with the direction corresponding to the respective beam-forming alternative (compare with step 211 of FIG. 2).

The controller 320 is also adapted to cause the receiver 310 to receive a beacon reading report (indicative of a reception quality at the device of the two or more beacon signals) from the device (compare with step 212 of FIG. 2).

The controller 320 is further adapted to select the beam-forming alternative for establishment of the link based on the received beacon reading report (compared with step 213 of FIG. 3). To this end, the example controller 320 of FIG. 3 comprises a selection unit (SEL) 321.

The controller 320 may be further adapted to cause the access node to establish the link to the device and communicate with the device over the established link using the selected beam-forming alternative (compare with steps 214 and 215 of FIG. 2).

The arrangement 300 and/or the access node may additionally comprise other components such as, for example, a signal processor (SIGN PROC) 330.

Figure 4:
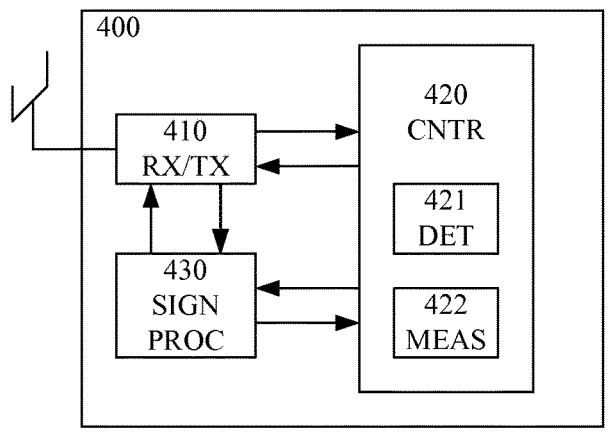
FIG. 4 is a block diagram illustrating an example arrangement according to some embodiments.

FIG. 4 illustrates an example arrangement 400 according to some embodiments. The arrangement 400 may be adapted to perform one or more of the method steps 221, 222, 224 and 225 as described in connection with FIG. 2.

The arrangement 400 may, for example, be comprised in a wireless communication device 110, 120, 130, 220 adapted to communicate with an access node over a communication link established based on beam-formed transmission using a beam-forming alternative selected from a plurality of beam-forming alternatives each corresponding to a direction emanating from the access node.

The arrangement 400 comprises a transmitter and a receiver, together represented as a transceiver (TX/RX) 410, and a controller (CNTR) 420.

The controller 420 is adapted to cause the receiver 410 to receive at least one of two or more beacon signals (simultaneously transmitted—using a respective beam-forming alternative—by the access node) having different respective predetermined content associated with the direction corresponding to the respective beam-forming alternative (compare with step 221 of FIG. 2).

The controller 420 is also adapted to generate a beacon reading report indicative of a reception quality at the device of the two or more beacon signals.

For purposes of detecting the beacon signals and generating the beacon reading report, the controller 420 may, for example, comprise a beacon signal detector (DET) 421 and a measurement unit (MEAS) 422 as illustrated in FIG. 4.

The controller 420 is further adapted to cause the transmitter 410 to transmit the beacon reading report to the access node (compare with step 222 of FIG. 2).

The controller 420 may be further adapted to cause the device to cooperate with the access node to establish the link and communicate with the access node over the established link using the selected beam-forming alternative (compare with steps 224 and 225 of FIG. 2).

The arrangement 400 and/or the device may additionally comprise other components such as, for example, a signal processor (SIGN PROC) 430.

Application of some embodiments may provide for efficient selection of a beam-forming alternative among a plurality of beam-forming alternatives.

For example, an average time until a suitable beam-forming selection can be made may be lowered compared to prior art approaches and a faster link establishment may be provided for. Typically, the fraction of time needed for initial search of an applicable beam direction (for example, the fraction of time that the access node needs to spend on beacon transmission) may be reduced.

One or more of the time reductions (e.g. average time to selection, fraction of time spend on beacon transmission, etc.) may typically relate to (e.g. be in the same order as) the number of antenna elements in the antenna array The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device or a wireless communication access node) comprising circuitry/logic or performing methods according to any of the embodiments.

Figure 5:
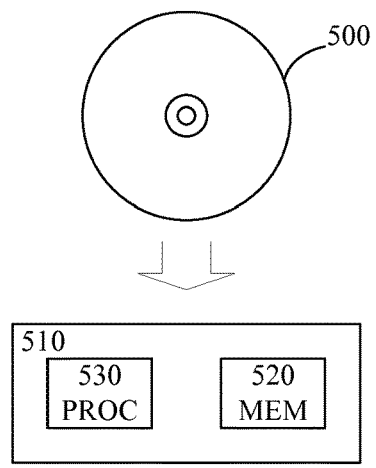
FIG. 5 is a schematic drawing illustrating an example computer readable medium according to some embodiments.

According to some embodiments, a computer program product comprises a computer readable medium such as, for example, a diskette or a CD-ROM as illustrated by the CD-ROM 500 of FIG. 5. The computer readable medium may have stored thereon a computer program comprising program instructions. The computer program may be loadable into a data-processing unit (PROC) 530, which may, for example, be comprised in an electronic apparatus 510 (e.g. an access node or a device). When loaded into the data-processing unit, the computer program may be stored in a memory (MEM) 520 associated with, or integral to, the data-processing unit. According to some embodiments, the computer program may, when loaded into and run by the data-processing unit, cause the data-processing unit to execute method steps according to, for example, the methods shown in FIG. 2.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The following is a list of example embodiments:

1. A method of a wireless communication access node (100, 300) adapted to establish a wireless communication link to a wireless communication device (110, 120, 130, 400) by beam-formed transmission using a beam-forming alternative selected from a plurality of beam-forming alternatives (102, 103, 104, 105, 106, 107, 108) each corresponding to a direction emanating from the wireless communication access node, the method comprising:

simultaneously transmitting (211) two or more beacon signals (231) having different respective predetermined content, wherein each beacon signal is transmitted using a respective one of the plurality of beam-forming alternatives and wherein the predetermined content of each beacon signal is associated with the direction corresponding to the respective beam-forming alternative;

receiving (212) a beacon reading report (232) from the wireless communication device, wherein the beacon reading report is indicative of a reception quality at the wireless communication device of the two or more beacon signals; and selecting (213) the beam-forming alternative for establishment of the wireless communication link based on the received beacon reading report.

2. The method according to example 1 further comprising:

establishing (214) the wireless communication link to the wireless communication device; and using (215) the selected beam-forming alternative for wireless communication (235) with the wireless communication device over the wireless communication link.

3. The method according to any of examples 1 through 2 wherein the beacon reading report comprises one or more of:

for one or more of the two or more beacon signals, an indication of whether or not the beacon signal is detected by the wireless communication device;

for one or more of the two or more beacon signals, a received signal strength of the beacon signal at the wireless communication device;

a beam direction setting of the wireless communication device;

an optimal direction indicator indicative of a direction associated with a strongest received beacon signal; and an optimal direction indicator indicative of an interpolation between two or more directions associated with respective received beacon signals.

4. The method according to any of examples 1 through 3 wherein the respective predetermined content of each beacon signal comprises a pilot signal, which is common to all of the two or more beacon signals, and a direction indicator.

5. The method according to any of examples 1 through 4 wherein the respective predetermined content of each beacon signal comprises a reference direction indicator defining a reference beam-forming alternative.

6. The method according to any of examples 1 through 5 wherein the respective predetermined content of each beacon signal provides for a signal distance between beacon signals associated with neighboring directions being above a signal distance threshold.

7. The method according to any of examples 1 through 6 wherein the respective predetermined content of each beacon signal provides for a signal distance between beacon signals associated with neighboring directions being larger than a signal distance between beacon signals associated with non-neighboring directions.

8. The method according to any of examples 1 through 5 wherein the respective predetermined content of each beacon signal provides for a signal distance between beacon signals associated with neighboring directions being smaller than a signal distance between beacon signals associated with non-neighboring directions.

9. A computer program product comprising a computer readable medium (500), having thereon a computer program comprising program instructions, the computer program being loadable into a data-processing unit (530) and adapted to cause execution of the method according to any of examples 1 through 8 when the computer program is run by the data-processing unit.

10. A method of a wireless communication device (110, 120, 130, 400) adapted to communicate with a wireless communication access node (100, 300) over a wireless communication link established based on beam-formed transmission using a beam-forming alternative selected from a plurality of beam-forming alternatives (102, 103, 104, 105, 106, 107, 108) each corresponding to a direction emanating from the wireless communication access node, the method comprising:

receiving (221) at least one of two or more beacon signals (231) having different respective predetermined content, wherein the two or more beacon signals are simultaneously transmitted by the wireless communication access node, each beacon signal is transmitted using a respective one of the plurality of beam-forming alternatives, and the predetermined content of each beacon signal is associated with the direction corresponding to the respective beam-forming alternative; and transmitting (222) a beacon reading report (232) to the wireless communication access node, wherein the beacon reading report is indicative of a reception quality at the wireless communication device of the two or more beacon signals.

11. The method according to example 10 further comprising generating the beacon reading report based on the received at least one of two or more beacon signals.

12. The method according to any of examples 10 through 11 wherein the beacon reading report comprises one or more of:

for one or more of the two or more beacon signals, an indication of whether or not the beacon signal is detected by the wireless communication device;

for one or more of the two or more beacon signals, a received signal strength of the beacon signal at the wireless communication device;

a beam direction setting of the wireless communication device;

an optimal direction indicator indicative of a direction associated with a strongest received beacon signal; and an optimal direction indicator indicative of an interpolation between two or more directions associated with respective received beacon signals.

13. A computer program product comprising a computer readable medium (500), having thereon a computer program comprising program instructions, the computer program being loadable into a data-processing unit (530) and adapted to cause execution of the method according to any of examples 10 through 12 when the computer program is run by the data-processing unit.

14. An arrangement for a wireless communication access node (100, 300) adapted to establish a wireless communication link to a wireless communication device (110, 120, 130, 400) by beam-formed transmission using a beam-forming alternative selected from a plurality of beam-forming alternatives (102, 103, 104, 105, 106, 107, 108) each corresponding to a direction emanating from the wireless communication access node, wherein the wireless communication access node comprises an antenna array (101, 301) and a beam-forming unit (322) for implementing the beam-formed transmission, the arrangement comprising a transmitter (310), a receiver (310) and a controller (320), wherein the controller is adapted to:

cause the transmitter to simultaneously transmit two or more beacon signals (231) having different respective predetermined content, wherein each beacon signal is transmitted using a respective one of the plurality of beam-forming alternatives and wherein the predetermined content of each beacon signal is associated with the direction corresponding to the respective beam-forming alternative;

cause the receiver to receive a beacon reading report (232) from the wireless communication device, wherein the beacon reading report is indicative of a reception quality at the wireless communication device of the two or more beacon signals; and select the beam-forming alternative for establishment of the wireless communication link based on the received beacon reading report.

15. The arrangement according to example 14 wherein the controller is further adapted to cause the wireless communication access node to:

establish the wireless communication link to the wireless communication device; and use the selected beam-forming alternative for wireless communication (235) with the wireless communication device over the wireless communication link.

16. The arrangement according to any of examples 14 through 15 wherein the beacon reading report comprises one or more of:

for one or more of the two or more beacon signals, an indication of whether or not the beacon signal is detected by the wireless communication device;

for one or more of the two or more beacon signals, a received signal strength of the beacon signal at the wireless communication device;

a beam direction setting of the wireless communication device;

an optimal direction indicator indicative of a direction associated with a strongest received beacon signal; and an optimal direction indicator indicative of an interpolation between two or more directions associated with respective received beacon signals.

17. The arrangement according to any of examples 14 through 16 wherein the respective predetermined content of each beacon signal comprises a pilot signal, which is common to all of the two or more beacon signals, and a direction indicator.

18. The arrangement according to any of examples 14 through 17 wherein the respective predetermined content of each beacon signal comprises a reference direction indicator defining a reference beam-forming alternative.

19. The arrangement according to any of examples 14 through 18 wherein the respective predetermined content of each beacon signal provides for a signal distance between beacon signals associated with neighboring directions being above a signal distance threshold.

20. The arrangement according to any of examples 14 through 19 wherein the respective predetermined content of each beacon signal provides for a signal distance between beacon signals associated with neighboring directions being larger than a signal distance between beacon signals associated with non-neighboring directions.

21. The arrangement according to any of examples 14 through 18 wherein the respective predetermined content of each beacon signal provides for a signal distance between beacon signals associated with neighboring directions being smaller than a signal distance between beacon signals associated with non-neighboring directions.

22. The arrangement of any of examples 14 through 21 further comprising the beam-forming unit (322).

23. A wireless communication access node comprising the arrangement according to any of examples 14 through 22.

24. An arrangement for a wireless communication device (110, 120, 130, 400) adapted to communicate with a wireless communication access node (100, 300) over a wireless communication link established based on beam-formed transmission using a beam-forming alternative selected from a plurality of beam-forming alternatives (102, 103, 104, 105, 106, 107, 108) each corresponding to a direction emanating from the wireless communication access node, the arrangement comprising a transmitter (410), a receiver (410) and a controller (420), wherein the controller is adapted to:

cause the receiver to receive at least one of two or more beacon signals (231) having different respective predetermined content, wherein the two or more beacon signals are simultaneously transmitted by the wireless communication access node, each beacon signal is transmitted using a respective one of the plurality of beam-forming alternatives, and the predetermined content of each beacon signal is associated with the direction corresponding to the respective beam-forming alternative; and cause the transmitter to transmit a beacon reading report (232) to the wireless communication access node, wherein the beacon reading report is indicative of a reception quality at the wireless communication device of the two or more beacon signals.

25. The arrangement according to example 24 wherein the controller is further adapted to generate the beacon reading report based on the received at least one of two or more beacon signals.

26. The arrangement according to any of examples 24 through 25 wherein the beacon reading report comprises one or more of:

for one or more of the two or more beacon signals, an indication of whether or not the beacon signal is detected by the wireless communication device;

for one or more of the two or more beacon signals, a received signal strength of the beacon signal at the wireless communication device;

a beam direction setting of the wireless communication device;

an optimal direction indicator indicative of a direction associated with a strongest received beacon signal; and an optimal direction indicator indicative of an interpolation between two or more directions associated with respective received beacon signals.

27. A wireless communication device comprising the arrangement according to any of examples 24 through 26.

The invention claimed is:

1. A beam-forming selection method of a wireless communication access node adapted to establish a wireless communication link to a wireless communication device by beam-formed transmission using a beam-forming alternative selected from a plurality of beam-forming alternatives each corresponding to a direction emanating from the wireless communication access node, the method comprising:

simultaneously transmitting two or more beacon signals having different respective predetermined content, wherein each beacon signal is transmitted using a respective one of the plurality of beam-forming alternatives and wherein the predetermined content of each beacon signal is associated with the direction corresponding to the respective beam-forming alternative;

receiving a beacon reading report from the wireless communication device, wherein the beacon reading report is indicative of a reception quality at the wireless communication device of the two or more beacon signals; and selecting the beam-forming alternative for establishment of the wireless communication link based on the received beacon reading report, wherein respective contents of the beacon signals are different from one another and are chosen such that a signal distance between the contents of beacon signals increases with increasing separation between the corresponding directions of the beacon signals or increases with decreasing separation between the corresponding directions of the beacon signals.

2. The method according to claim 1, further comprising:

establishing the wireless communication link to the wireless communication device; and using the selected beam-forming alternative for wireless communication with the wireless communication device over the wireless communication link.

3. The method according to claim 1, wherein the beacon reading report comprises one or more of:

for one or more of the two or more beacon signals, an indication of whether or not the beacon signal is detected by the wireless communication device;

for one or more of the two or more beacon signals, a received signal strength of the beacon signal at the wireless communication device;

a beam direction setting of the wireless communication device;

an optimal direction indicator indicative of a direction associated with a strongest received beacon signal; and an optimal direction indicator indicative of an interpolation between two or more directions associated with respective received beacon signals.

4. The method according to claim 1, wherein the respective predetermined content of each beacon signal comprises a pilot signal, which is common to all of the two or more beacon signals, and a direction indicator.

5. The method according to claim 1, wherein the respective predetermined content of each beacon signal comprises a reference direction indicator defining a reference beam-forming alternative.

6. The method according to claim 1, wherein the respective predetermined content of each beacon signal provides for a signal distance between the contents of beacon signals associated with neighboring directions being above a signal distance threshold.

7. The method according to claim 1, wherein the respective predetermined content of each beacon signal provides for a signal distance between beacon signals associated with neighboring directions being larger than a signal distance between the contents of beacon signals associated with non-neighboring directions.

8. The method according to claim 1, wherein the respective predetermined content of each beacon signal provides for a signal distance between the contents of beacon signals associated with neighboring directions being smaller than a signal distance between the contents of beacon signals associated with non-neighboring directions.

9. A nontransitory computer readable medium, having thereon a computer program comprising program instructions, the computer program being loadable into a data-processing unit and adapted to cause execution of a method when the computer program is run by the data-processing unit, wherein the method is a beam-forming selection method of a wireless communication access node adapted to establish a wireless communication link to a wireless communication device by beam-formed transmission using a beam-forming alternative selected from a plurality of beam-forming alternatives each corresponding to a direction emanating from the wireless communication access node, the method comprising:

simultaneously transmitting two or more beacon signals having different respective predetermined content, wherein each beacon signal is transmitted using a respective one of the plurality of beam-forming alternatives and wherein the predetermined content of each beacon signal is associated with the direction corresponding to the respective beam-forming alternative;

receiving a beacon reading report from the wireless communication device, wherein the beacon reading report is indicative of a reception quality at the wireless communication device of the two or more beacon signals; and selecting the beam-forming alternative for establishment of the wireless communication link based on the received beacon reading report, wherein respective contents of the beacon signals are different from one another and are chosen such that a signal distance between the contents of beacon signals increases with increasing separation between the corresponding directions of the beacon signals or increases with decreasing separation between the corresponding directions of the beacon signals.

10. A beam-forming selection method of a wireless communication device adapted to communicate with a wireless communication access node over a wireless communication link established based on beam-formed transmission using a beam-forming alternative selected from a plurality of beam-forming alternatives each corresponding to a direction emanating from the wireless communication access node, the method comprising:

receiving at least one of two or more beacon signals having different respective predetermined content, wherein the two or more beacon signals are simultaneously transmitted by the wireless communication access node, each beacon signal is transmitted using a respective one of the plurality of beam-forming alternatives, and the predetermined content of each beacon signal is associated with the direction corresponding to the respective beam-forming alternative; and transmitting a beacon reading report to the wireless communication access node, wherein the beacon reading report is indicative of a reception quality at the wireless communication device of the two or more beacon signals, wherein respective contents of the beacon signals are different from one another and are chosen such that a signal distance between the contents of beacon signals increases with increasing separation between the corresponding directions of the beacon signals or increases with decreasing separation between the corresponding directions of the beacon signals.

11. The method according to claim 10, further comprising generating the beacon reading report based on the received at least one of two or more beacon signals.

12. The method according to claim 10, wherein the beacon reading report comprises one or more of:

for one or more of the two or more beacon signals, an indication of whether or not the beacon signal is detected by the wireless communication device;

for one or more of the two or more beacon signals, a received signal strength of the beacon signal at the wireless communication device;

a beam direction setting of the wireless communication device;

an optimal direction indicator indicative of a direction associated with a strongest received beacon signal; and an optimal direction indicator indicative of an interpolation between two or more directions associated with respective received beacon signals.

13. A nontransitory computer readable medium, having thereon a computer program comprising program instructions, the computer program being loadable into a data-processing unit and adapted to cause execution of a method when the computer program is run by the data-processing unit, wherein the method is a beam-forming selection method of a wireless communication device adapted to communicate with a wireless communication access node over a wireless communication link established based on beam-formed transmission using a beam-forming alternative selected from a plurality of beam-forming alternatives each corresponding to a direction emanating from the wireless communication access node, the method comprising:

receiving at least one of two or more beacon signals having different respective predetermined content, wherein the two or more beacon signals are simultaneously transmitted by the wireless communication access node, each beacon signal is transmitted using a respective one of the plurality of beam-forming alternatives, and the predetermined content of each beacon signal is associated with the direction corresponding to the respective beam-forming alternative; and transmitting a beacon reading report to the wireless communication access node, wherein the beacon reading report is indicative of a reception quality at the wireless communication device of the two or more beacon signals, wherein respective contents of the beacon signals are different from one another and are chosen such that a signal distance between the contents of beacon signals increases with increasing separation between the corresponding directions of the beacon signals or increases with decreasing separation between the corresponding directions of the beacon signals.

14. An beam-forming selection arrangement for a wireless communication access node adapted to establish a wireless communication link to a wireless communication device by beam-formed transmission using a beam-forming alternative selected from a plurality of beam-forming alternatives each corresponding to a direction emanating from the wireless communication access node, wherein the wireless communication access node comprises an antenna array and a beam-forming unit for implementing the beam-formed transmission, the arrangement comprising:
a transmitter;
a receiver; and
a controller,
wherein the controller is adapted to:
cause the transmitter to simultaneously transmit two or more beacon signals having different respective predetermined content, wherein each beacon signal is transmitted using a respective one of the plurality of beam-forming alternatives and wherein the predetermined content of each beacon signal is associated with the direction corresponding to the respective beam-forming alternative;
cause the receiver to receive a beacon reading report from the wireless communication device, wherein the beacon reading report is indicative of a reception quality at the wireless communication device of the two or more beacon signals; and
select the beam-forming alternative for establishment of the wireless communication link based on the received beacon reading report,
wherein respective contents of the beacon signals are different from one another and are chosen such that a signal distance between the contents of beacon signals increases with increasing separation between the corresponding directions of the beacon signals or increases with decreasing separation between the corresponding directions of the beacon signals.

15. The arrangement according to claim 14, wherein the controller is further adapted to cause the wireless communication access node to:
establish the wireless communication link to the wireless communication device; and
use the selected beam-forming alternative for wireless communication with the wireless communication device over the wireless communication link.

16. The arrangement according to claim 14, wherein the beacon reading report comprises one or more of:
for one or more of the two or more beacon signals, an indication of whether or not the beacon signal is detected by the wireless communication device;
for one or more of the two or more beacon signals, a received signal strength of the beacon signal at the wireless communication device;
a beam direction setting of the wireless communication device;
an optimal direction indicator indicative of a direction associated with a strongest received beacon signal; and
an optimal direction indicator indicative of an interpolation between two or more directions associated with respective received beacon signals.

17. The arrangement according to claim 14, wherein the respective predetermined content of each beacon signal comprises a pilot signal, which is common to all of the two or more beacon signals, and a direction indicator.

18. The arrangement according to claim 14, wherein the respective predetermined content of each beacon signal comprises a reference direction indicator defining a reference beam-forming alternative.

19. The arrangement according to claim 14, wherein the respective predetermined content of each beacon signal provides for a signal distance between the contents of beacon signals associated with neighboring directions being above a signal distance threshold.

20. The arrangement according to claim 14, wherein the respective predetermined content of each beacon signal provides for a signal distance between the contents of beacon signals associated with neighboring directions being larger than a signal distance between the contents of beacon signals associated with non-neighboring directions.

21. The arrangement according to claim 14, wherein the respective predetermined content of each beacon signal provides for a signal distance between the contents of beacon signals associated with neighboring directions being smaller than a signal distance between the contents of beacon signals associated with non-neighboring directions.

22. The arrangement of claim 14, further comprising the beam-forming unit.

23. A wireless communication access node comprising the arrangement according to claim 14.

24. An beam-forming selection arrangement for a wireless communication device adapted to communicate with a wireless communication access node over a wireless communication link established based on beam-formed transmission using a beam-forming alternative selected from a plurality of beam-forming alternatives each corresponding to a direction emanating from the wireless communication access node, the arrangement comprising:
a transmitter;
a receiver; and
a controller,
wherein the controller is adapted to:
cause the receiver to receive at least one of two or more beacon signals having different respective predetermined content, wherein the two or more beacon signals are simultaneously transmitted by the wireless communication access node, each beacon signal is transmitted using a respective one of the plurality of beam-forming alternatives, and the predetermined content of each beacon signal is associated with the direction corresponding to the respective beam-forming alternative; and
cause the transmitter to transmit a beacon reading report to the wireless communication access node, wherein the beacon reading report is indicative of a reception quality at the wireless communication device of the two or more beacon signals,
wherein respective contents of the beacon signals are different from one another and are chosen such that a signal distance between the contents of beacon signals increases with increasing separation between the corresponding directions of the beacon signals or increases with decreasing separation between the corresponding directions of the beacon signals.

25. The arrangement according to claim 24, wherein the controller is further adapted to generate the beacon reading report based on the received at least one of two or more beacon signals.

26. The arrangement according to claim 24, wherein the beacon reading report comprises one or more of:

for one or more of the two or more beacon signals, an indication of whether or not the beacon signal is detected by the wireless communication device;

for one or more of the two or more beacon signals, a received signal strength of the beacon signal at the wireless communication device;

a beam direction setting of the wireless communication device;

an optimal direction indicator indicative of a direction associated with a strongest received beacon signal; and an optimal direction indicator indicative of an interpolation between two or more directions associated with respective received beacon signals.

27. A wireless communication device comprising the arrangement according to claim 24.

* * * * *